United States Patent [19]
Lockett

[11] Patent Number: 5,275,288
[45] Date of Patent: Jan. 4, 1994

[54] CAKE RACK

[76] Inventor: Ella-Winn M. Lockett, 816 Carpenter St., Akron, Ohio 44310

[21] Appl. No.: 69,401

[22] Filed: May 3, 1993

Related U.S. Application Data

[63] Continuation of Ser. No. 895,694, Jun. 9, 1992, abandoned.

[51] Int. Cl.⁵ .......................................... B65D 21/02
[52] U.S. Cl. .................................. 206/507; 206/505; 99/450; 220/23.83; 248/146; 248/153
[58] Field of Search ............... 99/415, 418, 426, 450, 99/DIG.; 211/126, 181; 248/146, 153; 220/506, 23.6, 23.83, 23.86; 206/499, 505, 507, 515

[56] References Cited

U.S. PATENT DOCUMENTS

| | | | |
|---|---|---|---|
| 196,453 | 10/1877 | Hoffman | 99/450 |
| 254,230 | 2/1882 | McFarland et al. | 220/506 |
| 901,747 | 10/1908 | Schomber | 211/181 |
| 1,041,751 | 10/1912 | De Long | 211/181 |
| 1,505,999 | 8/1924 | Gereke | 99/426 |
| 1,958,480 | 5/1934 | Janssens | 99/426 |
| 2,364,537 | 12/1944 | Kerth | 99/450 |
| 2,552,983 | 5/1951 | Lee | 211/181 |
| 2,678,143 | 5/1954 | Dillingham et al. | 99/442 |
| 2,777,308 | 1/1957 | Roberts et al. | |
| 2,902,174 | 9/1959 | Audsley | 206/499 |
| 4,991,811 | 2/1991 | Portnoy | 206/505 |

FOREIGN PATENT DOCUMENTS

| | | | |
|---|---|---|---|
| 695502 | 8/1953 | United Kingdom | 206/507 |
| 2206276 | 1/1989 | United Kingdom | 220/23.86 |

*Primary Examiner*—Harvey C. Hornsby
*Assistant Examiner*—Mark Spisich
*Attorney, Agent, or Firm*—Richard C. Litman

[57] ABSTRACT

The present invention is a wire cake rack for supporting either tubular or rectangular cakes while they cool. The wire cake rack can be either a round cake rack for supporting tubular cakes, e.g. Bundt cakes or a rectangular cake rack for supporting rectangular cakes, e.g. pound cakes. The round cake rack is made with sides in the shape of an open top cylinder that are manufactured integrally with a bottom that is concentric with the sides. The bottom has a greater diameter than the diameter of the sides. The bottom has handles on diametrically opposite edges of the bottom. The rectangular cake rack is made with sides in the shape of an open top rectangular box that are manufactured integrally with a bottom that is axially aligned with the sides. The bottom extends a predetermined distance beyond the sides. The bottom has handles on the two edges of the bottom that are longer than the other two edges of the bottom. The round wire cake racks can be stacked together because the round wire racks are made of slightly different diameters so that they can stack inside of each other. Similarly, the rectangular wire racks are made of slightly different axial dimensions so that they can stack inside of each other.

3 Claims, 2 Drawing Sheets

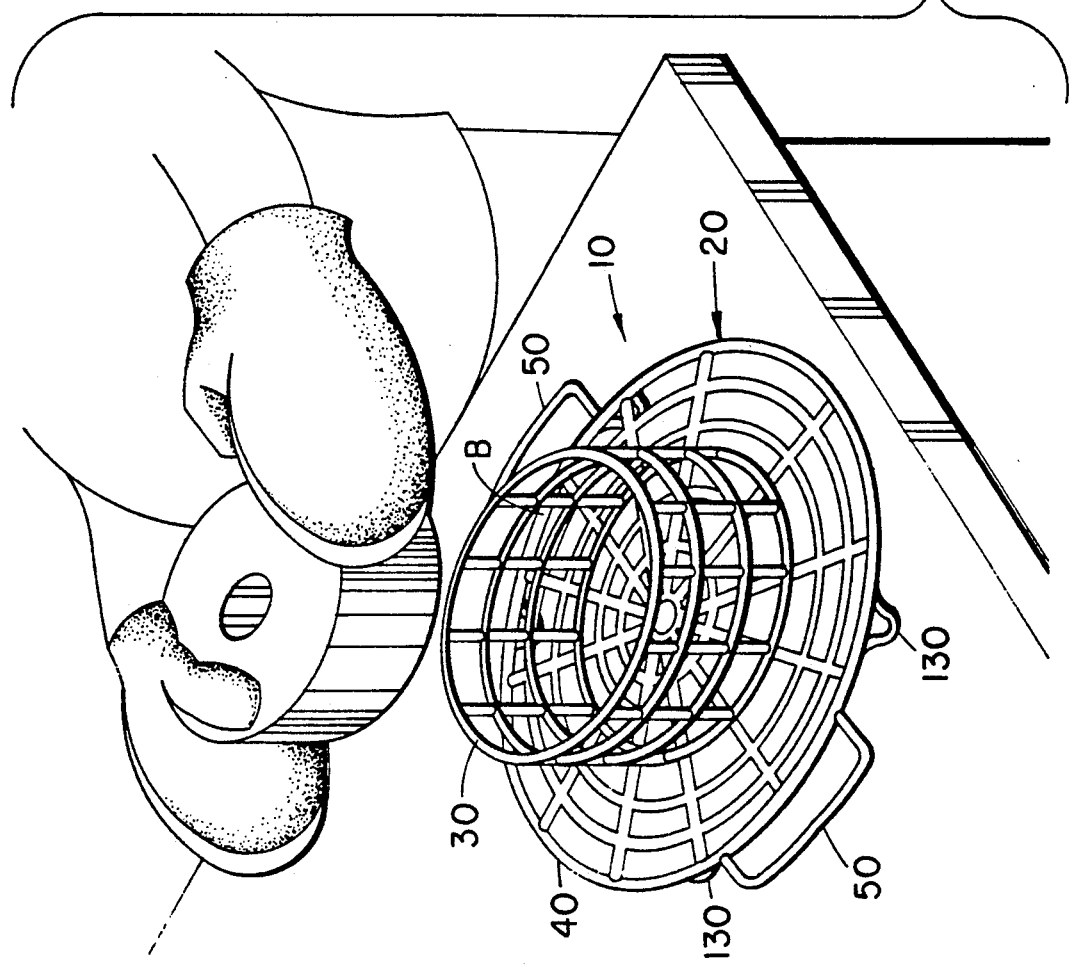
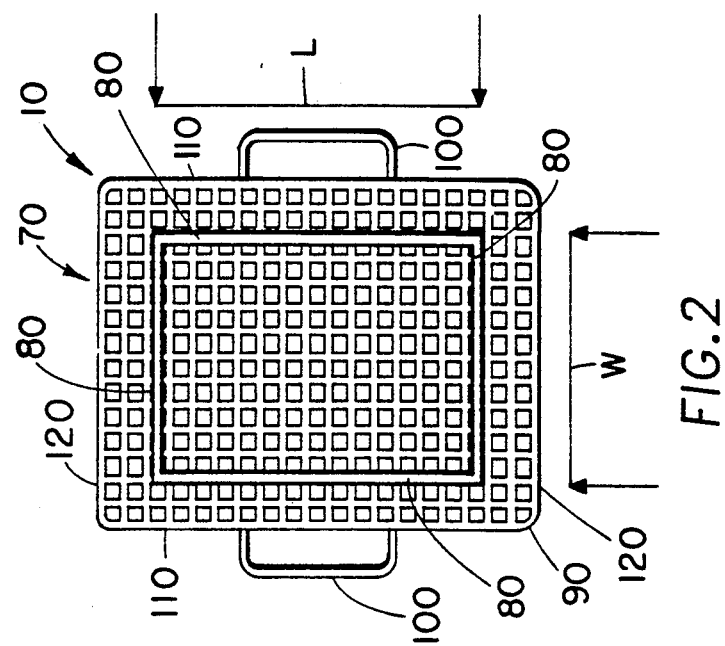

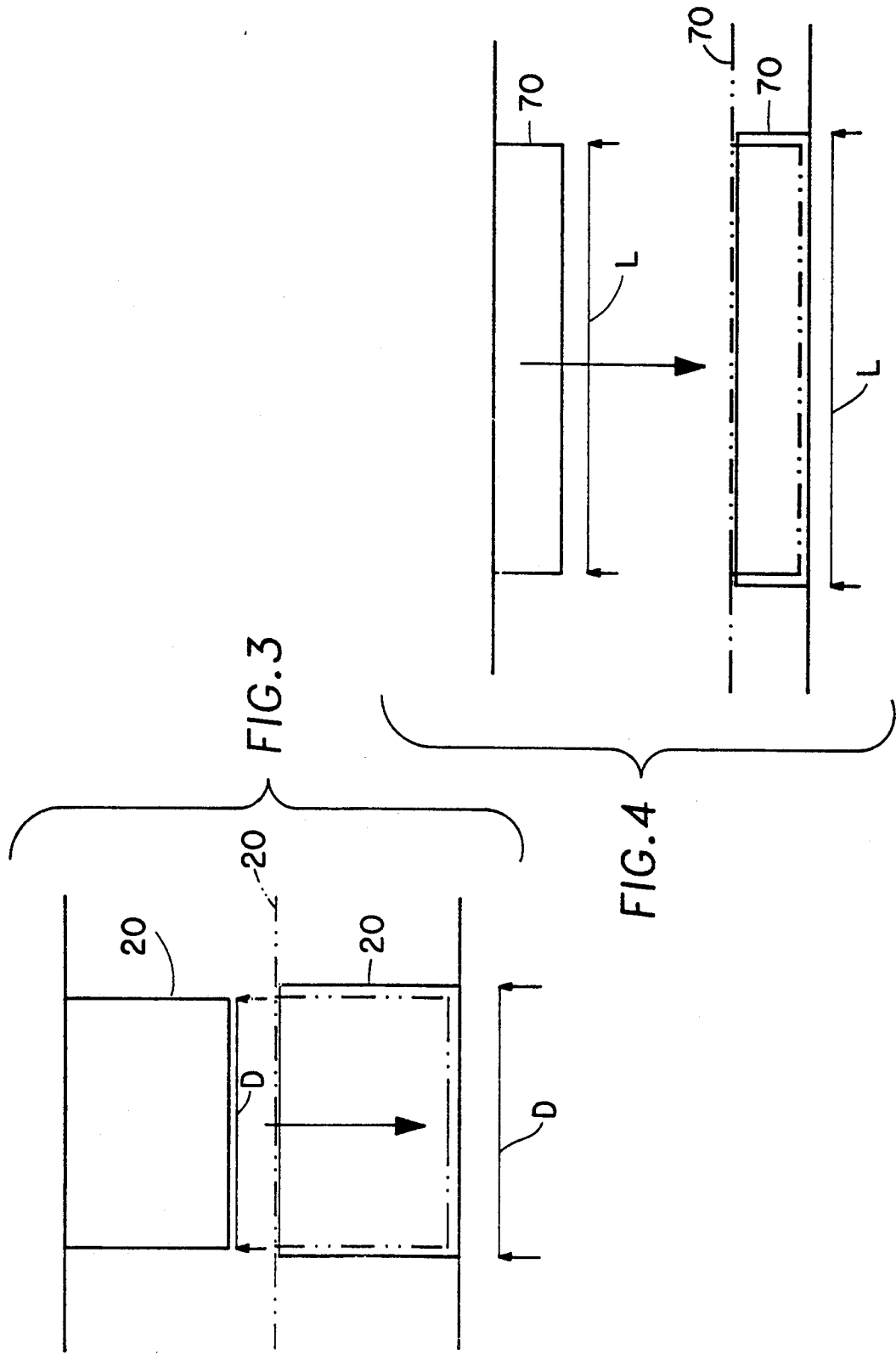

CAKE RACK

This is a continuation of co-pending U.S. patent application Ser. No. 07/895,694, filed Jun. 9, 1992, now abandoned.

BACKGROUND OF THE INVENTION

1. Field of the Invention

The present invention relates to one piece wire cake racks for cooling tubular or rectangular cakes.

2. Description of the Prior Art

The prior art cake cooling racks have inherent deficiencies. For example, there are well known cake racks that are a flat wire surface. These cake racks have the deficiency that they do not support the sides of the cake and, therefore, the cake is able to slide off of the cake rack onto the floor if the cake pan is not removed from the cake just right.

Heretofore, it has been proposed to provide devices for supporting a tube cake pan in an inverted position during the cooling of the cake. However, these devices do not provide for the tube cakes to be cooled independent of the cake pan.

U.S. Pat. No. 2,777,308 issued Jan. 15, 1957 to Robert W. Roberts discloses a combination cake plate and cooler for tube cakes that has extensions leading up from the cake plate for supporting the inner ring of a tube cake pan and the outer edge of a tube cake pan while a tube cake is cooling. The tube cake pan is supported in an inverted position during the cooling process and the tube cake is then removed from the cake pan and supported on the integral cake plate for cutting and serving of the tube cake.

None of the above inventions and patents, taken either singly or in combination, is seen to describe the instant invention as claimed.

SUMMARY OF THE INVENTION

Accordingly, it is a principal object of the invention to provide a wire cake rack for use in cooling a cake where the cake is unable to slide off of the cake rack because the wire rack is manufactured in one piece.

It is another object of the invention to provide wire cake racks that are able to be stacked for storage.

It is a further object of the invention to provide a wire cake rack for cooling a rectangular cake.

Still another object of the invention is to provide a wire cake rack for cooling a tubular cake.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a perspective view of the first embodiment of the present invention;

FIG. 2 is a top plan view of the second embodiment thereof;

FIG. 3 is a schematic view showing the stacking means of the first embodiment; and FIG. 4 is a schematic view showing the stacking means of the second embodiment.

Similar reference characters denote corresponding features consistently throughout the attached drawings.

DETAILED DESCRIPTION OF THE PREFERRED EMBODIMENTS

The present invention is a wire cake rack 10 for supporting either tubular or rectangular cakes while they cool. Referring to FIG. 1, the wire cake rack 10 is a round cake rack 20 for supporting tubular cakes, e.g. Bundt cakes B. The round cake rack 20 is made with sides 30 in the shape of an open top cylinder that are manufactured integrally with a bottom 40 that is concentric with the sides 30. The bottom 40 has a greater diameter than the diameter of the sides 30. The bottom 40 has handles 50 on diametrically opposite edges 60 of the bottom 40 and feet 130 attached to four points of the underside of the bottom 40.

Referring now to FIG. 2, the wire cake rack 10 is a rectangular cake rack 70 for supporting rectangular cakes, e.g. pound cakes. The rectangular cake rack 70 is made with sides 80 in the shape of an open top rectangular box that are manufactured integrally with a bottom 90 that is axially aligned with the sides 80. The bottom 90 extends a predetermined distance beyond the sides 80. The bottom 90 has handles 100 on the two edges 110 of the bottom 90 that are longer than the other two edges 120 of the bottom 90.

Referring now to FIG. 3, the round wire cake racks 20 can be stacked together. The wire racks 20 are made of slightly different diameters D so that they can stack inside of each other. Similarly, referring to FIG. 4, the rectangular wire racks 70 are made of slightly different axial dimensions L and W so that they can stack inside of each other.

It is to be understood that the present invention is not limited to the sole embodiment described above, but encompasses any and all embodiments within the scope of the following claims.

I claim:

1. A cake rack for use in the cooling of cakes after baking, comprising:
   a flat bottom surface having a major diameter, said flat bottom surface adapted to support a cake;
   and a side barrier having a minor diameter less than said major diameter, said side barrier being integrally attached to a top portion of said flat bottom surface and disposed at a right angle thereto, whereby a receptacle is formed which is open at one end and includes a flange extending outside said side barrier;
   said flat bottom surface having an edgeward periphery;
   said flat bottom surface having a first and second handle; said first handle being attached on said edgeward periphery of said flat bottom surface, said second handle being attached on said edgeward periphery of said flat bottom surface in a position substantially opposite to said first handle, said first and second handles extending outward from said edgeward periphery in a plane substantially parallel with said flat bottom surface;
   said flat bottom surface having at least three surface elevating legs, said surface elevating legs attached substantially isometrically along said edgeward periphery in a plane downwardly angled from the top portion of said flat bottom surface and said side barrier;

said side barrier comprising a plurality of upright pillars and a plurality of peripheral rails;

said upright pillars vertically extending from said flat bottom surface, said upright pillars spaced substantially equidistantly from each other about a periphery of said side barrier, each of said upright pillars being substantially dimensionally identical to each of the other upright pillars;

each of said peripheral rails positioned in a plane substantially parallel to said flat bottom surface, each of said peripheral rails being substantially dimensionally identical with each of the other peripheral rails, each of said peripheral rails being planarly equidistant from each adjacent peripheral rail;

said plurality of pillars connected to said plurality of peripheral rails to form said side barrier.

2. The cake rack according to claim 1, said flat bottom surface and said side barrier being round.

3. The cake rack according to claim 1, said flat bottom surface and said side barrier being rectangular.

* * * * *